April 22, 1924.
C. M. MARKHAM
BRACE CLAMP
Filed Nov. 15, 1919
1,491,353
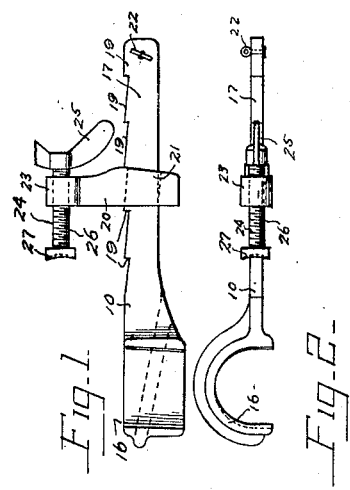
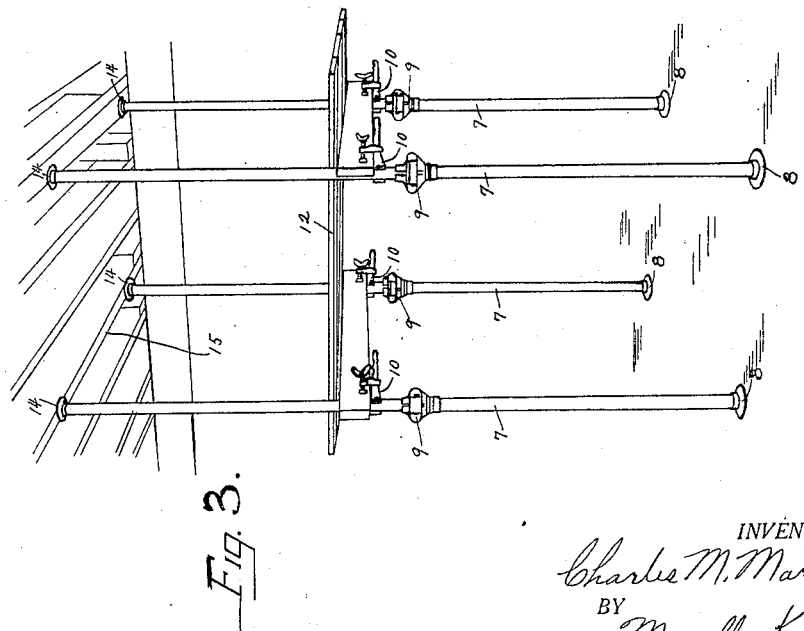
INVENTOR.
Charles M. Markham
BY
Morsell + Keeney,
ATTORNEYS.

Patented Apr. 22, 1924.

1,491,353

UNITED STATES PATENT OFFICE.

CHARLES M. MARKHAM, OF MILWAUKEE, WISCONSIN.

BRACE CLAMP.

Application filed November 15, 1919. Serial No. 338,409.

*To all whom it may concern:*

Be it known that I, CHARLES M. MARKHAM, a citizen of the United States, and resident of Milwaukee, in the county of Milwaukee and State of Wisconsin, have invented new and useful Improvements in Brace Clamps, of which the following is a description, reference being had to the accompanying drawings, which are a part of this specification.

This invention relates to improvements in brace clamps, more particularly, although not solely, adapted for fastening bracing and timbers during concrete and other construction work.

It is one of the objects of the present invention to provide a mechanism for concrete and other construction work which is adapted for clamping and supporting bracing, timbers and scaffolding.

A further object of the invention is to provide brace clamps having positive means for clamping timbers and scaffolding in place on their supporting standards.

A further object of the invention is to provide brace clamps having means for permitting the quick adjustment of the connection between the clamping members and the other parts.

A further object of the invention is to provide brace clamps that are of simple construction, are strong and durable and are well adapted for the purpose desired.

With the above and other objects in view, the invention consists of the improved brace clamps and scaffold hangers and their parts and combinations as set forth in the claims, and all equivalents thereof.

In the accompanying drawings in which the same reference characters indicate the same parts in all of the views:

Fig. 1 is a side view of the improved brace clamp;

Fig. 2 is a top view thereof; and

Fig. 3 is a perspective view showing the method of using the brace clamps for supporting a scaffold.

Referring to the drawings the numeral 7 indicates tubular standard members supported by bases 8. Midway up the tubular standard members 7 are jacks 9 used to raise or lower the upper portions of the standard members 7. Connected to said standards above said jacks 9 are supporting clamps 10 for the purpose of supporting scaffolding 12 used in concrete construction work.

The upper ends 14 of the tubular standard members 7 support joists 15 used in supporting flooring.

The supporting clamps 10 are provided with hook portions 16 which encircle the standard members 7. Arm or shank portions 17 project outwardly from the hook portions 16. In the supporting clamps 10 the hook portion 16 is at right angles to the arm portion. The arm portion 17 is provided with a series of teeth 19. Adjustably and slidably fitted onto the toothed arm member 17 is a slotted member 20. By tipping said slotted member slightly forward, the slot 21 permits it to move forward and backward on the arm, and by tipping it at an angle to the arm again, the teeth hold the member in adjusted position. A cotter pin 22 prevents the slotted member 20 from accidentally sliding off the arm. Threaded through a bore 23 in the end of the slotted member is a thumb screw 24 having winged portion 25 to permit the convenient turning of the screw. The forward end of the screw is provided with a washer 27 having a concave face. The concave face of the washer permits the use of steel rods as braces without danger of having the clamp slip therefrom. When wood bracing is used, the corners of the washers bite into the timbers to hold them firmly in place.

In operation, the hook portion 16 of the clamp 10 engages the tubular standard member 7 and the scaffolding 12 rests on the arm portion 17 and against the standard member. Then, the slotted member 20 is adjusted to the correct position and locked by means of the shoulder engagement and the thumb screw 24 is turned forward until the washer 27 presses firmly against the scaffolding or bracing thus clamping it securely in position.

From the foregoing description, it will be seen that the brace clamp and scaffold hanger is of simple construction and is well adapted for the purpose described.

What I claim as my invention is:

1. A clamp, comprising a bar having a hook portion formed integrally therewith for engaging a supporting standard, a slotted holding member slidably and tiltably positioned on said bar and extending approximately at right angles to the hook portion, said bar and slotted member having co-operating teeth to hold the said member in different positions of adjustment, and a clamping screw carried by the slotted member for engagement with a support extending approximately at right angles to the standard.

2. A clamp for securing an approximately horizontal support to a standard, comprising a bar having teeth on one edge and provided with a hook portion for engaging the standard, a slotted holding member slidably and tiltably positioned on the bar and extending approximately at right angles to the hook portion, said bar and slotted member having co-operating teeth to hold the said member in different positions of adjustment, and a clamping screw threaded through the outer end portion of the slotted member for clampingly engaging the horizontal support interposed between the screw and the standard.

In testimony whereof, I affix my signature.

CHARLES M. MARKHAM.